United States Patent
Slimi et al.

(10) Patent No.: US 12,499,119 B2
(45) Date of Patent: Dec. 16, 2025

(54) TEMPLATE-BASED GENERATION OF SYNTHETIC DATA SETS

(71) Applicant: ServiceNow, Inc., Santa Clara, CA (US)

(72) Inventors: Khalil Slimi, Montreal (CA); Anusha Devi Nadigepu Narsing Rao, Santa Clara, CA (US); Venu Madhav Matcha, Fremont, CA (US); Simeng Han, San Diego, CA (US); Rohit Dikshit, Fremont, CA (US)

(73) Assignee: ServiceNow, Inc., Santa Clara, CA (US)

( * ) Notice: Subject to any disclaimer, the term of this patent is extended or adjusted under 35 U.S.C. 154(b) by 185 days.

(21) Appl. No.: 18/366,585

(22) Filed: Aug. 7, 2023

(65) Prior Publication Data
US 2025/0053568 A1   Feb. 13, 2025

(51) Int. Cl.
*G06F 16/25* (2019.01)
(52) U.S. Cl.
CPC .................................. *G06F 16/254* (2019.01)
(58) Field of Classification Search
None
See application file for complete search history.

(56) References Cited

U.S. PATENT DOCUMENTS

| 4,941,084 A | 7/1990 | Terada |
| 5,185,860 A | 2/1993 | Wu |
| 5,237,518 A | 8/1993 | Sztipanovits |
| 5,261,097 A | 11/1993 | Saxon |
| 5,265,252 A | 11/1993 | Rawson, III |

(Continued)

FOREIGN PATENT DOCUMENTS

| EP | 0433979 A2 | 6/1991 |
| EP | 1607824 A2 | 12/2005 |

(Continued)

OTHER PUBLICATIONS

International Searching Authority, International Search Report and Written Opinion mailed on Nov. 7, 2024, issued in connection with International Patent Application No. PCT/US2024/038157, filed Jul. 16, 2024, 11 pages.

(Continued)

*Primary Examiner* — Scott A. Waldron
(74) *Attorney, Agent, or Firm* — McDonnell Boehnen Hulbert & Berghoff LLP

(57) ABSTRACT

A method includes obtaining first data records associated with a first schema. Each respective data record of the first data records may include corresponding values of a plurality of fields. The method also includes obtaining a mapping representing a transformation of a field of the plurality of fields from the first schema to a training schema, and selecting, based on the mapping and for each respective data record of the first data records, a corresponding value of the field from the first data records. The method further includes generating second data records by transforming, based on the mapping and for each respective data record of the first data records, the corresponding value of the field from the first schema to the training schema. The method additionally includes training a machine learning model based on the second data records.

20 Claims, 8 Drawing Sheets

(56) References Cited

U.S. PATENT DOCUMENTS

| | | | |
|---|---|---|---|
| 5,367,685 A | 11/1994 | Gosling |
| 5,390,297 A | 2/1995 | Barber |
| 5,442,791 A | 8/1995 | Wrabetz |
| 5,452,415 A | 9/1995 | Hotka |
| 5,522,042 A | 5/1996 | Fee |
| 5,533,116 A | 7/1996 | Vesterinen |
| 5,655,081 A | 8/1997 | Bonnell |
| 5,659,736 A | 8/1997 | Hasegawa |
| 5,671,412 A | 9/1997 | Christiano |
| 5,696,701 A | 12/1997 | Burgess |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke |
| 5,887,139 A | 3/1999 | Madison, Jr. |
| 5,909,217 A | 6/1999 | Bereiter |
| 5,937,165 A | 8/1999 | Schwaller |
| 5,949,976 A | 9/1999 | Chappelle |
| 5,978,594 A | 11/1999 | Bonnell |
| 6,021,437 A | 2/2000 | Chen |
| 6,041,347 A | 3/2000 | Harsham |
| 6,088,717 A | 7/2000 | Reed |
| 6,101,500 A | 8/2000 | Lau |
| 6,128,016 A | 10/2000 | Coelho |
| 6,131,118 A | 10/2000 | Stupek, Jr. |
| 6,134,581 A | 10/2000 | Ismael |
| 6,138,122 A | 10/2000 | Smith |
| 6,148,335 A | 11/2000 | Haggard |
| 6,166,732 A | 12/2000 | Mitchell |
| 6,167,448 A | 12/2000 | Hemphill |
| 6,175,866 B1 | 1/2001 | Holloway |
| 6,175,878 B1 | 1/2001 | Seaman |
| 6,260,050 B1 | 7/2001 | Yost |
| 6,263,457 B1 | 7/2001 | Anderson |
| 6,272,150 B1 | 8/2001 | Hrastar |
| 6,336,138 B1 | 1/2002 | Caswell |
| 6,363,421 B2 | 3/2002 | Barker |
| 6,393,386 B1 | 5/2002 | Zager |
| 6,397,245 B1 | 5/2002 | Johnson, II |
| 6,434,626 B1 | 8/2002 | Prakash |
| 6,438,592 B1 | 8/2002 | Killian |
| 6,456,306 B1 | 9/2002 | Chin |
| 6,466,932 B1 | 10/2002 | Dennis |
| 6,487,590 B1 | 11/2002 | Foley |
| 6,505,248 B1 | 1/2003 | Casper |
| 6,526,442 B1 | 2/2003 | Stupek, Jr. |
| 6,621,823 B1 | 9/2003 | Mellquist |
| 6,707,795 B1 | 3/2004 | Noorhosseini |
| 6,742,015 B1 | 5/2004 | Bowman-Amuah |
| 6,763,380 B1 | 7/2004 | Mayton |
| 6,816,898 B1 | 11/2004 | Scarpelli |
| 6,895,586 B1 | 5/2005 | Brasher |
| 6,948,175 B1 | 9/2005 | Fong |
| 6,985,901 B1 | 1/2006 | Sachse |
| 7,003,564 B2 | 2/2006 | Greuel |
| 7,028,228 B1 | 4/2006 | Lovy |
| 7,043,537 B1 | 5/2006 | Pratt |
| 7,043,661 B2 | 5/2006 | Valadarsky |
| 7,062,683 B2 | 6/2006 | Warpenburg |
| 7,096,459 B2 | 8/2006 | Keller |
| 7,146,574 B2 | 12/2006 | Goldthwaite |
| 7,197,466 B1 | 3/2007 | Peterson |
| 7,215,360 B2 | 5/2007 | Gupta |
| 7,216,304 B1 | 5/2007 | Gourdol |
| 7,222,147 B1 | 5/2007 | Black |
| 7,281,170 B2 | 10/2007 | Taylor |
| 7,412,502 B2 | 8/2008 | Fearn |
| 7,505,872 B2 | 3/2009 | Keller |
| 7,593,013 B2 | 9/2009 | Agutter |
| 7,596,716 B2 | 9/2009 | Frost |
| 7,617,073 B2 | 11/2009 | Trinon |
| 7,660,731 B2 | 2/2010 | Chaddha |
| 7,676,294 B2 | 3/2010 | Baier |
| 7,676,437 B2 | 3/2010 | Satkunanathan |
| 7,840,490 B1 | 11/2010 | Sellers |
| 7,877,783 B1 | 1/2011 | Cline |
| 7,890,869 B1 | 2/2011 | Mayer |
| 7,966,398 B2 | 6/2011 | Wiles, Jr. |
| 8,060,396 B1 | 11/2011 | Bessler |
| 8,196,210 B2 | 6/2012 | Sterin |
| 8,321,948 B2 | 11/2012 | Robinson |
| 8,407,669 B2 | 3/2013 | Yee |
| 8,554,750 B2 | 10/2013 | Rangarajan |
| 8,595,647 B2 | 11/2013 | Sabin |
| 8,620,818 B2 | 12/2013 | Hughes |
| 8,646,093 B2 | 2/2014 | Myers |
| 8,674,992 B2 | 3/2014 | Poston |
| 8,700,682 B2 | 4/2014 | Tedder |
| 8,725,647 B2 | 5/2014 | Disciascio |
| 9,053,460 B2 | 6/2015 | Gilbert |
| 9,779,063 B1 | 10/2017 | Dykema |
| 10,673,963 B1 | 6/2020 | Feiguine |
| 10,749,943 B1 | 8/2020 | Feiguine |
| 10,771,344 B2 | 9/2020 | Bitterfeld |
| 10,824,650 B2 | 11/2020 | Bar Oz |
| 10,944,654 B2 | 3/2021 | Rimar |
| 10,999,152 B1 | 5/2021 | Bar Oz |
| 11,025,481 B1 | 6/2021 | Louca |
| 11,089,115 B2 | 8/2021 | Garty |
| 11,095,506 B1 | 8/2021 | Erblat |
| 11,275,580 B2 | 3/2022 | Tamir |
| 11,277,475 B1 | 3/2022 | Tal |
| 11,281,442 B1 | 3/2022 | Tal |
| 11,296,922 B2 | 4/2022 | Leibkowiz |
| 11,301,503 B2 | 4/2022 | Burli |
| 11,379,089 B2 | 7/2022 | Goswami |
| 11,451,573 B2 | 9/2022 | Waplington |
| 11,470,107 B2 | 10/2022 | Waplington |
| 2002/0116340 A1 | 8/2002 | Hellberg |
| 2002/0133584 A1 | 9/2002 | Greuel |
| 2002/0158969 A1 | 10/2002 | Gupta |
| 2003/0118087 A1 | 6/2003 | Goldthwaite |
| 2003/0200293 A1 | 10/2003 | Fearn |
| 2005/0015217 A1 | 1/2005 | Weidl |
| 2005/0091356 A1 | 4/2005 | Izzo |
| 2006/0026453 A1 | 2/2006 | Frost |
| 2006/0095461 A1 | 5/2006 | Raymond |
| 2006/0179058 A1 | 8/2006 | Bram |
| 2006/0293942 A1 | 12/2006 | Chaddha |
| 2007/0033279 A1 | 2/2007 | Battat |
| 2007/0188494 A1 | 8/2007 | Agutter |
| 2007/0288389 A1 | 12/2007 | Vaughan |
| 2008/0133289 A1 | 6/2008 | Armour |
| 2008/0148253 A1 | 6/2008 | Badwe |
| 2008/0319779 A1 | 12/2008 | Hughes |
| 2009/0088875 A1 | 4/2009 | Baier |
| 2009/0228984 A1 | 9/2009 | Sterin |
| 2010/0110932 A1 | 5/2010 | Doran |
| 2016/0231936 A1 | 8/2016 | Nelson |
| 2018/0123940 A1 | 5/2018 | Rimar |
| 2019/0073257 A1 | 3/2019 | Dasgupta |
| 2019/0104398 A1 | 4/2019 | Owen |
| 2020/0050689 A1 | 2/2020 | Tal |
| 2020/0204443 A1 | 6/2020 | Bar Oz |
| 2020/0301678 A1 | 9/2020 | Burman |
| 2021/0133205 A1 | 5/2021 | Motamedi et al. |
| 2021/0194764 A1 | 6/2021 | Badyan |
| 2022/0029886 A1 | 1/2022 | Hameiri |
| 2023/0139783 A1* | 5/2023 | Garib .................... G06N 3/044 |
| | | 707/769 |
| 2023/0169328 A1 | 6/2023 | Haptonstahl |
| 2023/0186026 A1 | 6/2023 | Arthur et al. |

FOREIGN PATENT DOCUMENTS

| | | |
|---|---|---|
| WO | 9934285 W | 7/1999 |
| WO | 0052559 W | 9/2000 |
| WO | 0179970 W | 10/2001 |

(56) References Cited

OTHER PUBLICATIONS

Jarmolinski, Jakub, "Configuration management database integration with IPAM database for cloud computing company," Helsinki Metropolia University of Applied Sciences, Thesis, 2020, 71 pages.

* cited by examiner

TEMPLATE-BASED GENERATION OF SYNTHETIC DATA SETS

BACKGROUND

Training of machine learning (ML) models depends on the number and/or quality of training samples of a training data set. A target number of training samples present in the training data set for a particular ML model may depend on a size of the particular ML model, a target accuracy of outputs of the particular ML model, a complexity of the task to be performed by the particular ML model, and/or a diversity of the training samples, among other factors. In some cases, to reach the target number of training samples, the training data set may be generated based on a plurality of different input data sets. The different input data sets may be structured and/or formatted in different ways, and it may thus be difficult to convert the different input data sets to a common structure and/or format used by the training data set.

SUMMARY

A machine learning (ML) model may be trained using a training data set organized according to a training schema. For example, the training schema may indicate one or more input variables that the ML model is configured to process, one or more output variables that the ML model is configured to generate, and/or a structure and/or format of the input and/or output variables. A software application may be configured to facilitate generation of the training data set based on a plurality of different input data sets. Each of the plurality of different input data sets may include a corresponding plurality of data records organized according to a corresponding schema that differs from the training schema.

The software application may be configured to transform the corresponding plurality of data records of each respective data set of the different input data sets from the corresponding schema thereof to the training schema. The software application may include, for each respective data set, a corresponding mapping that represents a transformation of one or more fields of the corresponding schema to the training schema. The mapping may be represented by a template that includes predefined markup language defining the training schema and template variables included in the predefined markup language to represent placement of the one or more fields within the training schema. By populating the template variables with corresponding values of the one or more fields from the respective data set, at least a portion of the respective data set may be transformed from the corresponding schema thereof to the training schema. The training data set may be generated based on the respective data set as transformed.

In some cases, the training schema may indicate that one or more values from the respective data set are to be represented using a particular file type. For example, the ML model may be configured to process data (e.g., text) represented using a portable document format (PDF) file, an MSG file, an EML file, a comma-separated values (CSV) file, and/or an XLSX file, among other possibilities. Accordingly, the software application may be configured to generate a file of the particular file type based on the one or more values from the respective data, and output the file as part of a plurality of data records organized according to the training schema. In cases where the respective data set is missing a field and/or value thereof that is part of the training schema, the software application may be configured to assign a default value to the field and/or synthesize a new value for the field.

In some implementations, each record of the respective data set may be used to generate two or more output records having the training schema. For example, a given record in the respective data set may be translated into two or more languages, and/or variations of the given record may be generated based on different default values and/or synthesized values for one or more fields. Translating the given record into multiple languages may allow for training of multiple language-specific ML models based on the respective data set. Assigning default values to and/or synthesizing new values for the missing fields may increase an informational diversity of the training data set.

Accordingly, a first example embodiment may involve obtaining a first plurality of data records associated with a first schema. Each respective data record of the first plurality of data records may include a corresponding plurality of values of a plurality of fields. The first example embodiment may also involve obtaining a mapping representing a transformation of one or more fields of the plurality of fields from the first schema to a training schema. The first example embodiment may additionally involve selecting, based on the mapping and for each respective data record of the first plurality of data records, one or more corresponding values of the one or more fields from the first plurality of data records. The first example embodiment may further involve generating a second plurality of data records by transforming, based on the mapping and for each respective data record of the first plurality of data records, the one or more corresponding values of the one or more fields from the first schema to the training schema. The first example embodiment may yet further involve training a machine learning model based on the second plurality of data records.

A second example embodiment may involve a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
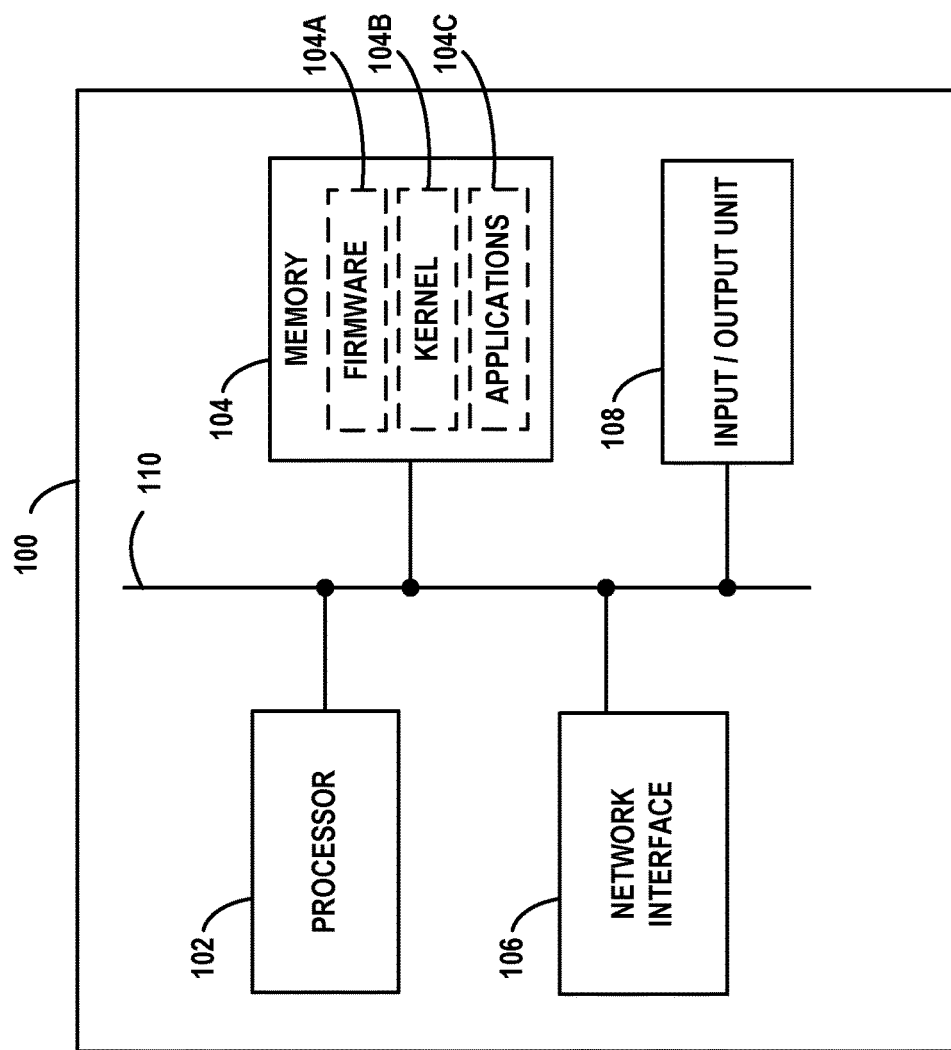
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security. Nonetheless, the embodiments herein are not limited to enterprise applications or environments, and can be more broadly applied.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure. In some cases, applications structured differently than MVC, such as those using unidirectional data flow, may be employed.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HyperText Markup Language (HTML) and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® bytecode) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
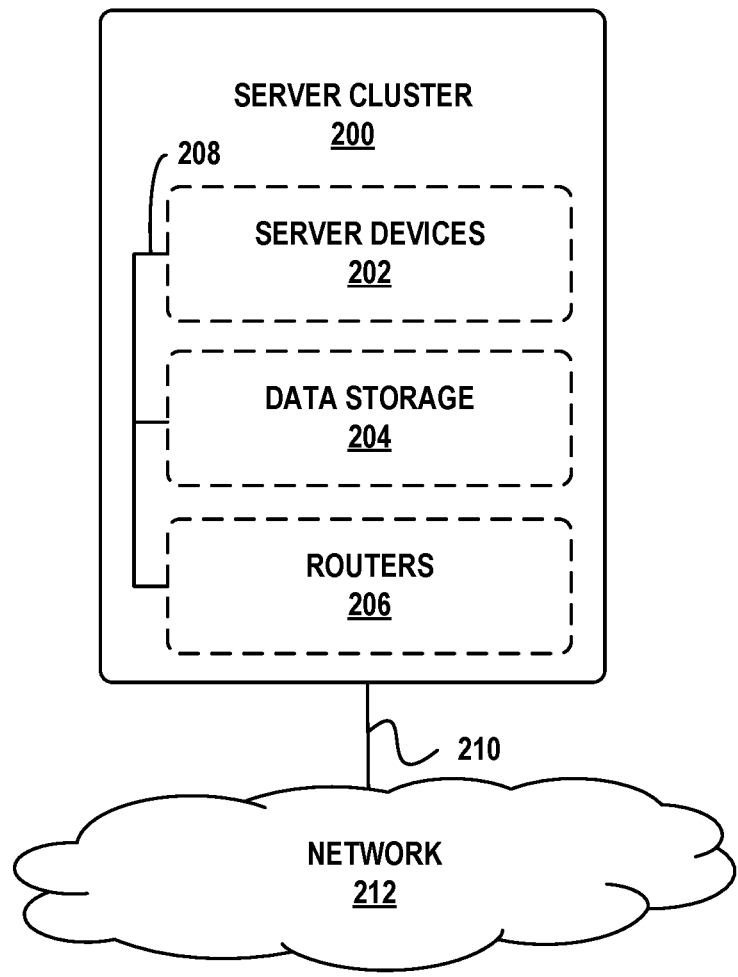
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as HTML, the extensible Markup Language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
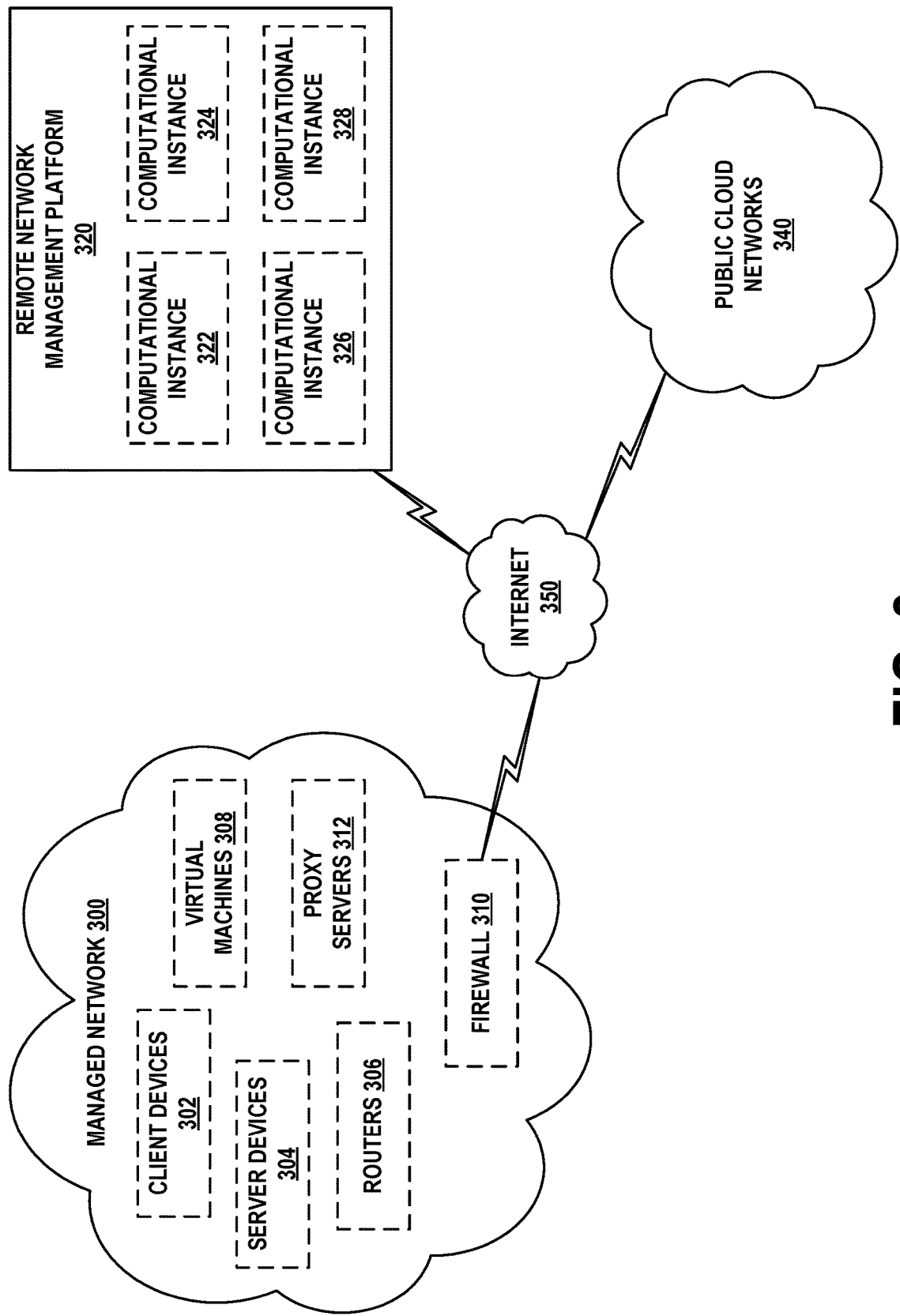
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion.

Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components.

Possibly with the assistance of proxy servers 312, remote network management platform 320 may also be able to discover and manage aspects of public cloud networks 340 that are used by managed network 300. While not shown in FIG. 3, one or more proxy servers 312 may be placed in any of public cloud networks 340 in order to facilitate this discovery and management.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include Amazon AWS Cloud, Microsoft Azure Cloud (Azure), Google Cloud Platform (GCP), and IBM Cloud Platform. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
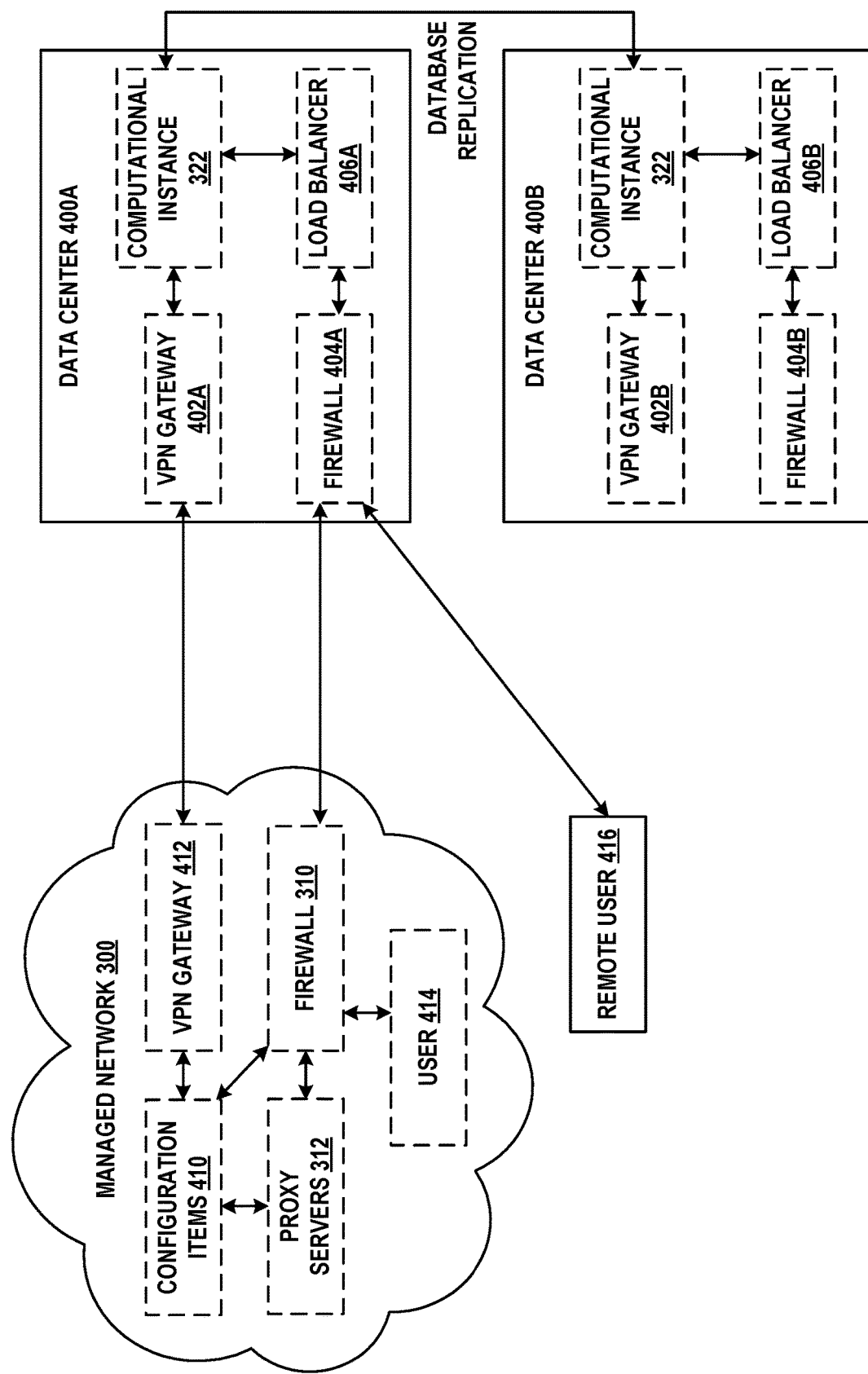
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any components thereof, any applications or services executing thereon, as well as relationships between devices, components, applications, and services. Thus, the term "configuration items" may be shorthand for part of all of any physical or virtual device, or any application or service remotely discoverable or managed by computational instance 322, or relationships between discovered devices, applications, and services. Configuration items may be represented in a configuration management database (CMDB) of computational instance 322.

As stored or transmitted, a configuration item may be a list of attributes that characterize the hardware or software that the configuration item represents. These attributes may include manufacturer, vendor, location, owner, unique identifier, description, network address, operational status, serial number, time of last update, and so on. The class of a configuration item may determine which subset of attributes are present for the configuration item (e.g., software and hardware configuration items may have different lists of attributes).

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively). In various alternatives, devices in managed network 300, such as proxy servers 312, may use a secure protocol (e.g., TLS) to communicate directly with one or more data centers.

IV. Example Discovery

In order for remote network management platform 320 to administer the devices, applications, and services of managed network 300, remote network management platform 320 may first determine what devices are present in managed network 300, the configurations, constituent components, and operational statuses of these devices, and the applications and services provided by the devices. Remote network management platform 320 may also determine the relationships between discovered devices, their components, applications, and services. Representations of each device, component, application, and service may be referred to as a configuration item. The process of determining the configuration items and relationships within managed network 300 is referred to as discovery, and may be facilitated at least in part by proxy servers 312. Representations of configuration items and relationships are stored in a CMDB.

While this section describes discovery conducted on managed network 300, the same or similar discovery procedures may be used on public cloud networks 340. Thus, in some environments, "discovery" may refer to discovering configuration items and relationships on a managed network and/or one or more public cloud networks.

For purposes of the embodiments herein, an "application" may refer to one or more processes, threads, programs, client software modules, server software modules, or any other software that executes on a device or group of devices. A "service" may refer to a high-level capability provided by one or more applications executing on one or more devices working in conjunction with one another. For example, a web service may involve multiple web application server threads executing on one device and accessing information from a database application that executes on another device.

Figure 5:
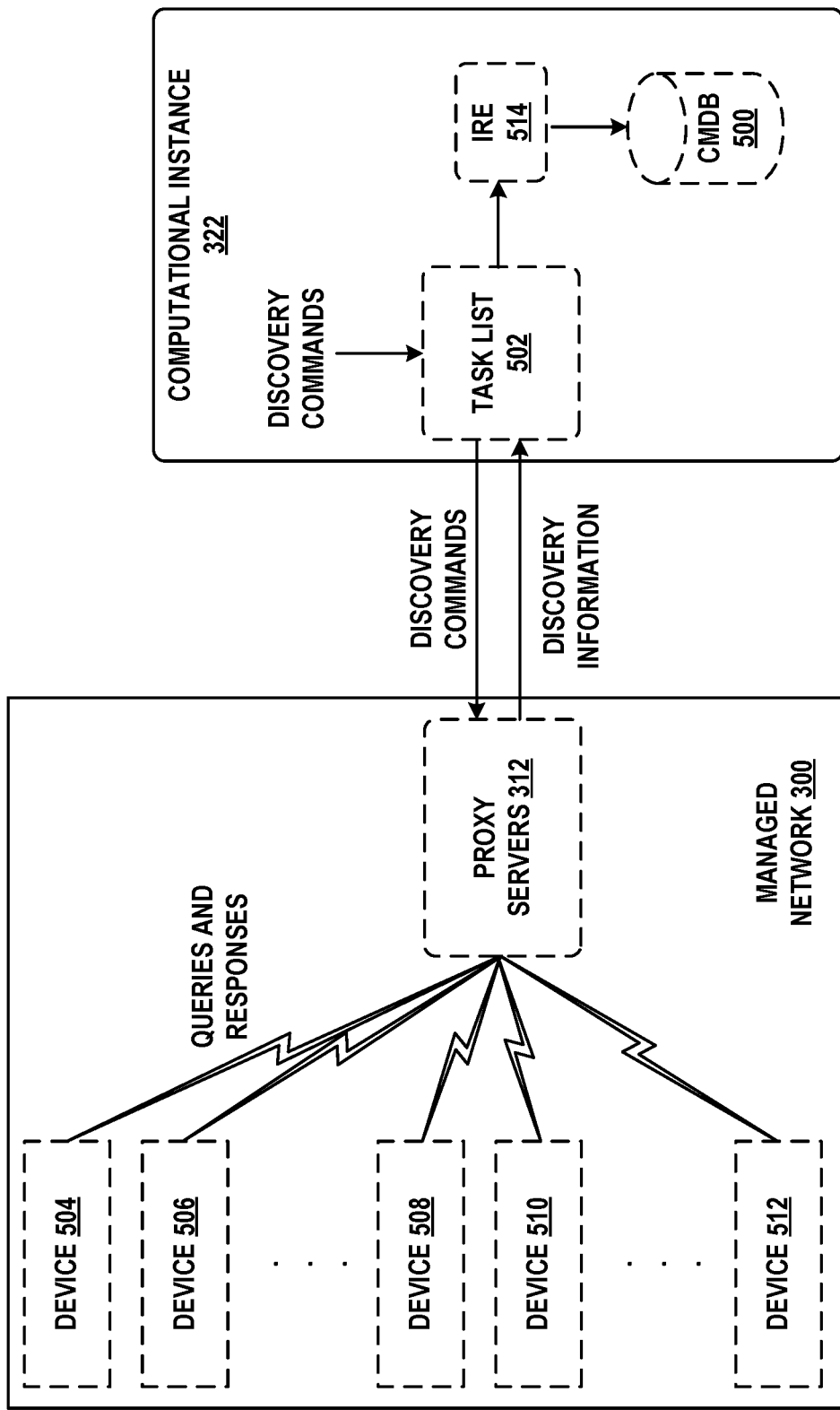
FIG. 5 depicts another communication environment involving a remote network management architecture, in accordance with example embodiments.

FIG. 5 provides a logical depiction of how configuration items and relationships can be discovered, as well as how information related thereto can be stored. For sake of simplicity, remote network management platform 320, public cloud networks 340, and Internet 350 are not shown.

In FIG. 5, CMDB 500, task list 502, and identification and reconciliation engine (IRE) 514 are disposed and/or operate within computational instance 322. Task list 502 represents a connection point between computational instance 322 and proxy servers 312. Task list 502 may be referred to as a queue, or more particularly as an external communication channel (ECC) queue. Task list 502 may represent not only the queue itself but any associated processing, such as adding, removing, and/or manipulating information in the queue.

As discovery takes place, computational instance 322 may store discovery tasks (jobs) that proxy servers 312 are to perform in task list 502, until proxy servers 312 request these tasks in batches of one or more. Placing the tasks in task list 502 may trigger or otherwise cause proxy servers 312 to begin their discovery operations. For example, proxy servers 312 may poll task list 502 periodically or from time to time, or may be notified of discovery commands in task list 502 in some other fashion. Alternatively or additionally, discovery may be manually triggered or automatically triggered based on triggering events (e.g., discovery may automatically begin once per day at a particular time).

Regardless, computational instance 322 may transmit these discovery commands to proxy servers 312 upon request. For example, proxy servers 312 may repeatedly query task list 502, obtain the next task therein, and perform this task until task list 502 is empty or another stopping condition has been reached. In response to receiving a discovery command, proxy servers 312 may query various devices, components, applications, and/or services in managed network 300 (represented for sake of simplicity in FIG. 5 by devices 504, 506, 508, 510, and 512). These devices, components, applications, and/or services may provide responses relating to their configuration, operation, and/or status to proxy servers 312. In turn, proxy servers 312 may then provide this discovered information to task list 502 (i.e., task list 502 may have an outgoing queue for holding discovery commands until requested by proxy servers 312 as well as an incoming queue for holding the discovery information until it is read).

IRE 514 may be a software module that removes discovery information from task list 502 and formulates this discovery information into configuration items (e.g., representing devices, components, applications, and/or services discovered on managed network 300) as well as relationships therebetween. Then, IRE 514 may provide these configuration items and relationships to CMDB 500 for storage therein. The operation of IRE 514 is described in more detail below.

In this fashion, configuration items stored in CMDB 500 represent the environment of managed network 300. As an example, these configuration items may represent a set of physical and/or virtual devices (e.g., client devices, server devices, routers, or virtual machines), applications executing thereon (e.g., web servers, email servers, databases, or storage arrays), as well as services that involve multiple individual configuration items. Relationships may be pairwise definitions of arrangements or dependencies between configuration items.

In order for discovery to take place in the manner described above, proxy servers 312, CMDB 500, and/or one or more credential stores may be configured with credentials for the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

There are two general types of discovery—horizontal and vertical (top-down). Each are discussed below.

A. Horizontal Discovery

Horizontal discovery is used to scan managed network 300, find devices, components, and/or applications, and then populate CMDB 500 with configuration items representing these devices, components, and/or applications. Horizontal discovery also creates relationships between the configuration items. For instance, this could be a "runs on" relationship between a configuration item representing a software application and a configuration item representing a server device on which it executes. Typically, horizontal discovery is not aware of services and does not create relationships between configuration items based on the services in which they operate.

There are two versions of horizontal discovery. One relies on probes and sensors, while the other also employs patterns. Probes and sensors may be scripts (e.g., written in JAVASCRIPT®) that collect and process discovery information on a device and then update CMDB 500 accordingly. More specifically, probes explore or investigate devices on managed network 300, and sensors parse the discovery information returned from the probes.

Patterns are also scripts that collect data on one or more devices, process it, and update the CMDB. Patterns differ from probes and sensors in that they are written in a specific discovery programming language and are used to conduct detailed discovery procedures on specific devices, components, and/or applications that often cannot be reliably discovered (or discovered at all) by more general probes and sensors. Particularly, patterns may specify a series of operations that define how to discover a particular arrangement of devices, components, and/or applications, what credentials to use, and which CMDB tables to populate with configuration items resulting from this discovery.

Both versions may proceed in four logical phases: scanning, classification, identification, and exploration. Also, both versions may require specification of one or more ranges of IP addresses on managed network 300 for which discovery is to take place. Each phase may involve communication between devices on managed network 300 and proxy servers 312, as well as between proxy servers 312 and task list 502. Some phases may involve storing partial or preliminary configuration items in CMDB 500, which may be updated in a later phase.

In the scanning phase, proxy servers 312 may probe each IP address in the specified range(s) of IP addresses for open Transmission Control Protocol (TCP) and/or User Datagram Protocol (UDP) ports to determine the general type of device and its operating system. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist.

In the classification phase, proxy servers 312 may further probe each discovered device to determine the type of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the specific type of operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 10, as a set of WINDOWS®-10-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es)

assigned to these network interface(s), IP address(es) used by the particular device and so on. This identification information may be stored as one or more configuration items in CMDB 500 along with any relevant relationships therebetween. Doing so may involve passing the identification information through IRE 514 to avoid generation of duplicate configuration items, for purposes of disambiguation, and/or to determine the table(s) of CMDB 500 in which the discovery information should be written.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (software applications), and so on. Once more, the discovered information may be stored as one or more configuration items in CMDB 500, as well as relationships.

Running horizontal discovery on certain devices, such as switches and routers, may utilize SNMP. Instead of or in addition to determining a list of running processes or other application-related information, discovery may determine additional subnets known to a router and the operational state of the router's network interfaces (e.g., active, inactive, queue length, number of packets dropped, etc.). The IP addresses of the additional subnets may be candidates for further discovery procedures. Thus, horizontal discovery may progress iteratively or recursively.

Patterns are used only during the identification and exploration phases—under pattern-based discovery, the scanning and classification phases operate as they would if probes and sensors are used. After the classification stage completes, a pattern probe is specified as a probe to use during identification. Then, the pattern probe and the pattern that it specifies are launched.

Patterns support a number of features, by way of the discovery programming language, that are not available or difficult to achieve with discovery using probes and sensors. For example, discovery of devices, components, and/or applications in public cloud networks, as well as configuration file tracking, is much simpler to achieve using pattern-based discovery. Further, these patterns are more easily customized by users than probes and sensors. Additionally, patterns are more focused on specific devices, components, and/or applications and therefore may execute faster than the more general approaches used by probes and sensors.

Once horizontal discovery completes, a configuration item representation of each discovered device, component, and/or application is available in CMDB 500. For example, after discovery, operating system version, hardware configuration, and network configuration details for client devices, server devices, and routers in managed network 300, as well as applications executing thereon, may be stored as configuration items. This collected information may be presented to a user in various ways to allow the user to view the hardware composition and operational status of devices.

Furthermore, CMDB 500 may include entries regarding the relationships between configuration items. More specifically, suppose that a server device includes a number of hardware components (e.g., processors, memory, network interfaces, storage, and file systems), and has several software applications installed or executing thereon. Relationships between the components and the server device (e.g., "contained by" relationships) and relationships between the software applications and the server device (e.g., "runs on" relationships) may be represented as such in CMDB 500.

More generally, the relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

In this manner, remote network management platform 320 may discover and inventory the hardware and software deployed on and provided by managed network 300.

B. Vertical Discovery

Vertical discovery is a technique used to find and map configuration items that are part of an overall service, such as a web service. For example, vertical discovery can map a web service by showing the relationships between a web server application, a LINUX® server device, and a database that stores the data for the web service. Typically, horizontal discovery is run first to find configuration items and basic relationships therebetween, and then vertical discovery is run to establish the relationships between configuration items that make up a service.

Patterns can be used to discover certain types of services, as these patterns can be programmed to look for specific arrangements of hardware and software that fit a description of how the service is deployed. Alternatively or additionally, traffic analysis (e.g., examining network traffic between devices) can be used to facilitate vertical discovery. In some cases, the parameters of a service can be manually configured to assist vertical discovery.

In general, vertical discovery seeks to find specific types of relationships between devices, components, and/or applications. Some of these relationships may be inferred from configuration files. For example, the configuration file of a web server application can refer to the IP address and port number of a database on which it relies. Vertical discovery patterns can be programmed to look for such references and infer relationships therefrom. Relationships can also be inferred from traffic between devices—for instance, if there is a large extent of web traffic (e.g., TCP port 80 or 8080) traveling between a load balancer and a device hosting a web server, then the load balancer and the web server may have a relationship.

Relationships found by vertical discovery may take various forms. As an example, an email service may include an email server software configuration item and a database application software configuration item, each installed on different hardware device configuration items. The email service may have a "depends on" relationship with both of these software configuration items, while the software configuration items have a "used by" reciprocal relationship with the email service. Such services might not be able to be fully determined by horizontal discovery procedures, and instead may rely on vertical discovery and possibly some extent of manual configuration.

C. Advantages of Discovery

Regardless of how discovery information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

In another example, suppose that a database application is executing on a server device, and that this database application is used by an employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular hardware device fails.

In general, configuration items and/or relationships between configuration items may be displayed on a web-based interface and represented in a hierarchical fashion. Modifications to such configuration items and/or relationships in the CMDB may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

V. CMDB Identification Rules and Reconciliation

A CMDB, such as CMDB 500, provides a repository of configuration items and relationships. When properly provisioned, it can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information including configuration items and relationships in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API) of IRE 514. Then, IRE 514 may use a set of configurable identification rules to uniquely identify configuration items and determine whether and how they are to be written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to IRE 514, IRE 514 may attempt to match the information with one or more rules. If a match is found, the configuration item is written to the CMDB or updated if it already exists within the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, IRE 514 might only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by IRE 514 or in another fashion. These configuration items may be deleted or flagged for manual de-duplication.

VI. Example Software Application

Figure 6:
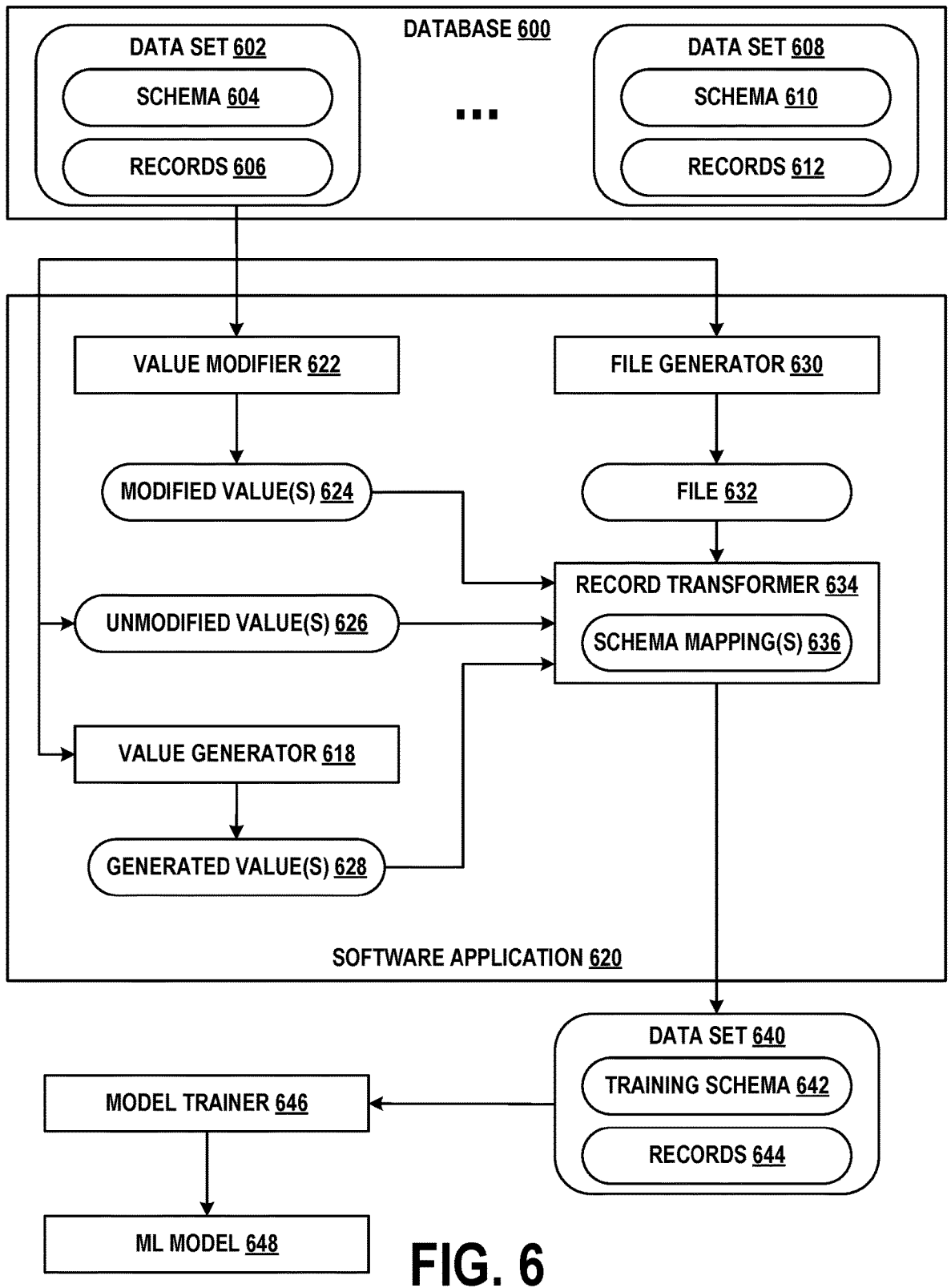
FIG. 6 depicts aspects of a software application, in accordance with example embodiments.

FIG. 6 illustrates an example software application 620 that may be configured to generate an output data set by transforming one or more input data sets. Specifically, software application 620 may be configured to generate data set 640 based on one or more of data set 602 through data set 608 (i.e., data sets 602-608). Software application 620 may include value modifier 622, file generator 630, value generator 618, and record transformer 634.

Data set 640 may be used by model trainer 646 to train ML model 648 to perform one or more tasks associated with data set 640. Training of ML model 648 may include one or more of (i) adjusting parameters of ML model 648 based on a first (training) portion of data set 640 and/or (ii) evaluating performance of ML model 648 based on a second (evaluation) portion of data set 640. Accordingly, "training" is used herein to indicate the process of model parameter selection/refinement and/or model testing/evaluation. Training of ML model 648 may be performed prior to using a trained version of ML model 648 to process new data that is not part of data set 640.

Database 600 may be configured to store data sets 602-608. Each of data sets 602-608 may be associated with a corresponding schema and corresponding records. For example, data set 602 may be associated with schema 604 and records 606, and data set 608 may be associated with schema 610 and records 612. Each of records 606 through records 612 (i.e., records 606-612) may include a corresponding plurality of values of a corresponding plurality of fields. For example, records 606 may include values for a first plurality of fields, and records 612 may include values for a second plurality of fields, which may be the same as, similar to, and/or different from the first plurality of fields. Each of records 606-612 may be organized using one or more tables.

The corresponding schema of a given data set of data sets 602-608 may represent a structure of one or more database tables used to store the corresponding records, and/or one or more relationships among a plurality of database tables used to store the corresponding records. Thus, schema 604 may indicate how records 606 are organized and/or structured, while schema 610 may indicate how records 612 are organized and/or structured. For example, schema 604 may represent how the first plurality of fields represented by records 606 is organized into one or more tables. Additionally or alternatively, when records 606 are stored using two or more tables, schema 604 may represent how the two or more tables and/or the fields thereof relate to one another.

Schema 604 through schema 610 (i.e., schemas 604-610) may differ from one another, and/or each of schemas 604-610 may differ from training schema 642 that defines a structure of the training data used by model trainer 646 for training of ML model 648. Accordingly, data sets 602-608 might not be directly usable as training data for ML model 648, since the records thereof are not organized in the manner expected by model trainer 646. Additionally, a single data set of data sets 602-608 might not include a sufficient number of records to allow for training of ML model 648. Thus, two or more of data sets 602-608 may be combined to generate training data with the sufficient number of records. Accordingly, even if training schema 642 were selected to match the corresponding schema of a particular data set of data sets 602-608, the schema of any other data set might not match the schema of the particular data set. Further, some of data sets 602-608 may be missing fields and/or values of fields that are part of training schema 642, and thus training ML model 648 using such data sets may be difficult and/or result in poor model performance.

Accordingly, software application 620 may be configured to transform one or more of data sets 602-608 into data set 640 that includes records 644 organized according to training schema 642. Data set 640 may be based on one or more of data sets 602-608, and records 644 may thus represent one or more of records 606-612 transformed from the corresponding schema(s) thereof into training schema 642. For the sake of example, the following description assumes that data set 640 is based at least on data set 602, and thus records 644 represent at least records 606 transformed from schema 604 to training schema 642.

Value modifier 622 may be configured to generate modified value(s) 624 based on first value(s) of a first subset of the fields of each respective record of records 606. Value modifier 622 may be configured to modify a format and/or content of the first value(s). Value modifier 622 may include one or more ML models and/or one or more rule-based algorithms.

In one example, value modifier 622 may be configured to generate modified value(s) 624 by removing one or more predefined characters from the first value(s). In another example, value modifier 622 may be configured to generate modified value(s) 624 by modifying word forms (e.g., by stemming, lemmatizing, and/or parsing out predetermined character combinations, etc.) of words represented by the first value(s). In a further example, when the first value(s) represent text, value modifier 622 may be configured to generate modified value(s) 624 by translating the first value(s) from a source language (e.g., English) to one or more target languages (e.g., Spanish, French, and/or German). Accordingly, value modifier 622 may alter the first value(s) based on one of more target properties of data set 640 and/or training schema 642.

Unmodified value(s) 626 represent second value(s) of a second subset of the fields of each respective record of records 606, where the second value(s) may be used without modification to generate data set 640. The second subset of the fields may be the same or similar in both schema 604 and training schema 642, although the second subset of fields may be arranged differently in schema 604 and training schema 642.

Value generator 618 may be configured to determine generated value(s) 628 based on and/or corresponding to third value(s) of a third subset of fields of each respective record of records 606. For example, value generator 618 may be configured to generate new values for any fields that are missing from records 606 and/or any fields that are presents in records 606 but for which one or more records are missing values.

In one example, value generator 618 may be configured to assign one or more default values to the third subset of fields. The one or more default values may include (i) a first predefined value (e.g., N/A, NULL, etc.) indicating that a given field and/or value thereof is missing from a given record and/or (ii) a second predefined value that serves as a replacement for the missing field and/or missing value(s) thereof. The predefined value may be specified by a user of software application 620, and may be based on and/or correspond to a task for which ML model 648 is to be trained.

In another example, value generator 618 may be configured to synthesize one or more new values for the third subset of fields. Value generator 618 may include one or more ML models configured to process records 606 and/or subsets thereof and, based thereon, select or generate the new values that match, fit with, and/or approximate a distribution of records 606. Thus, generated value(s) 628 may be similar to and/or indiscernible from other, non-synthesized values of records 606.

For example, when a given record of records 606 is missing a value of a particular field, the one or more ML models may be configured to identify other records in data sets 602-608 that are similar to the given record. Value generator 618 may be configured to select, from these similar records, a value based on which to populate the particular field. Value generator 618 may be configured to populate the particular field using the value selected from the similar records, or a modified version of this value.

As another example, the one or more ML models may include a generative model configured to synthesize new values that are not part of records 606, but that approximate a distribution of records 606. The generative model may be configured to generate a new value for a missing field of the given record based on processing one or more other values of the given record, and/or one or more values of other records of records 606. Thus, the generative model may generate new values that match and/or are contextually consistent with the records into which these new values are to be added.

As noted above, value modifier 622 and/or value generator 618 may each include a corresponding ML model, such as an artificial neural network, configured to perform at least some of the operations thereof. The artificial neural network may be based on a convolutional architecture, a transformer architecture, and/or a diffusion architecture, among other possibilities. In some implementations, the corresponding ML model may include and/or form a large language model (LLM) configured to perform a plurality of text-based tasks. For example, the ML models of value modifier 622 and/or value generator 618 may be trained to perform text translation, text selection, text filtering, and/or text generation, among other text processing operations.

File generator 630 may be configured to generate file 632 based on fourth value(s) of a fourth subset of the fields of each respective record of records 606. A file type of file 632 may be based on ML model 648, which may be configured to process files of a particular file type. Thus, file generator 630 may be configured to represent the fourth value(s) of each respective record using a corresponding instance of file 632 of the particular file type to allow ML model 648 to be trained based on file 632. File 632 may be a PDF file, an MSG file, an EML file, a CSV file, and/or an XLSX file, among other possibilities.

File generator 630 may include a file mapping and/or file template that indicates, for each respective value of the fourth value(s), corresponding placement and/or formatting of the respective value within file 632. Thus, both the content and the formatting of the fourth value(s) within file 632 may resemble the content and the formatting of values that ML model 648 is likely and/or expected to encounter at inference time. Accordingly, file 632 may allow ML model 648 to learn to perform its task based on both the content and the formatting of values in files of the particular file type. In some implementations, file generator 630 may additionally or alternatively generate file 632 based on modified value(s) 624 and/or generated value(s) 628.

Record transformer 634 may be configured to determine data set 640 based on modified value(s) 624, unmodified value(s) 626, generated value(s) 628, and/or file 632. Data set 640 may include records 644 arranged according to training schema 642. Record transformer 634 may use schema mapping(s) 636 to transform modified value(s) 624, unmodified value(s) 626, generated value(s) 628, and/or file 632 from schema 604 to training schema 642. Thus, records 644 may represent a transformed version of records 606, with records 644 being usable by model trainer 646 to train ML model 648.

Schema mapping(s) 636 may include instructions for transforming at least records 606 of data set 602 from schema 604 thereof into training schema 642. Schema mapping(s) 636 may also include instructions for transforming other data sets of data sets 602-608 from the corresponding schemas thereof into training schema 642. For example, schema mapping(s) 636 may include instructions for transforming each of data sets 602-608 from the corresponding schemas thereof into training schema 642. Due to differences in schemas 604-610, the schema mapping(s) 636 for each of data sets 602-608 may differ from one another.

Schema mapping(s) 636 may include, for example, a markup language template that includes markup language (e.g., HTML, XML) defining training schema 642, and template variables that indicate a placement of data from records 606 within training schema 642. Schema mapping(s) 636 may also represent, for each respective template variable, a corresponding data source based on which the respective template variable is to be assigned a corresponding value. The corresponding data source may include modified value(s) 624, unmodified value(s) 626, generated value(s) 628, and/or file 632. Schema mapping(s) 636 may thus indicate, for each respective field of a plurality of fields of schema 604, a corresponding destination in training schema 642 for value(s) of the respective field.

Record transformer 634 may be configured to replace the template variables in schema mapping(s) 636 with the value(s) from the corresponding data sources, thereby populating the markup language with the corresponding values. The markup language, as populated with the corresponding values, may represent modified value(s) 624, unmodified value(s) 626, generated value(s) 628, and/or file 632 arranged according to one or more database tables defined by training schema 642.

Software application 620 may be configured to implement a one-to-one mapping or a one-to-many mapping between records 606 and records 644. For example, in a one-to-one mapping, a number of records 606 may be equal to a number of records 644, with each respective record of records 606 being used to generate only one corresponding record of records 644. In a one-to-many mapping, a number of records 644 may exceed a number of records 606 (e.g., by an integer factor of two or more), with each respective record of records 606 being used to generate two or more corresponding records of records 644.

For example, each respective record of records 606 may be used by value modifier 622 to generate two or more corresponding modified value(s) 624, and/or by value generator 618 to generate two or more corresponding generated value(s) 628. Different combinations of modified value(s) 624, unmodified value(s) 626, and generated value(s) 628 may be used to generate, for respective record of records 606, two or more corresponding records of records 644. For example, each respective record of records 606 may be used to generate two sets of modified value(s) 624, one set of unmodified value(s) 626, three sets of generated value(s)

628, and one file 632, resulting in six different corresponding records that form part of records 644.

The operations of each of value modifier 622, value generator 618, file generator 630, and/or record transformer 634 may be repeated with respect to each respective record of records 606, and/or each respective record of other data sets of data sets 602-608. The operations performed by value modifier 622, value generator 618, file generator 630, and/or record transformer 634 with respect to each data set may differ among data sets 602-608 due to, for example, differences among schema 604-610. For example, value modifier 622 may operate on respective values of a first set of fields of data set 602, and on respective values of a second set of fields of data set 608, where the first set of fields is different from the second set of fields. That is, transforming records 606 into training schema 642 may involve different operations than transforming records 612 into training schema 642, and software application 620 may be configured to handle such differences.

As one example, ML model 648 may be configured to generate one or more database entries based on a textual message (e.g., email, chat, activity stream, system logs, etc.) representing a user inquiry related to a technical problem. Thus, records 644 may include one or more input fields representing the user inquiry in its original format, and one or more output fields representing (i) the user inquiry reorganized as database entries and (ii) an output of processing the input fields by ML model 648. For example, the input fields may represent unmodified portions of the textual message, including the subject line, body, and/or file attachments. The output fields may represent aspects of the input fields arranged according to a schema used by a software application configured to track the status of the user inquiries. The outputs of processing of the input fields by ML model 648 may include a classification of the technical problem, a suggested solution, and/or a suggested technician for resolving the technical problem, among other possibilities. Thus, ML model 648 may be configured to facilitate resolution of technical problems by identifying and summarizing the technical problems, and/or providing suggested solutions thereto.

Data sets 602-608 may also represent technical problems and corresponding resolutions thereto. Data sets 602-608 may be generated by technicians, possibly using one or more different software application for tracking the status of corresponding user inquiries. For example, differences in the software application may be a result of user preferences, developer preferences, and/or properties of the technical problems that these software applications track, among others. Thus, data sets 602-608 may provide examples of how technicians successfully resolved various technical issues. However, due to differences in how the different software applications organize the user inquiries and solutions thereto, schemas 604-610 may differ from training schema 642. Accordingly, by performing the operations discussed above, software application 620 may be configured to transform data sets 602-608 into training schema 642 usable by ML model 648, while preserving the informational content of these data sets.

Accordingly, ML model 648 may be trained using data sourced from a plurality of different software applications for handling technical problems, a plurality of different technical problems, a plurality of different technicians, and/or a plurality of different portions of a managed network and/or remote network management platform. Accordingly, data set 640 may provide a diverse representation of technical problems and resolutions thereto, thus allowing for improvements in the performance of ML model 648.

Additionally or alternatively, software application 620 may be used in contexts other than training of ML model 648. That is, data set 640 and/or variations thereof may be generated and used for tasks other than training of ML model 648, such as for database migration, data set consolidation, and/or other software development tasks. Accordingly, training schema 642 may represent a task-specific structure of the data used as part of the software development task for which data set 640 is generated.

VII. Example Schema Mapping

Figure 7:
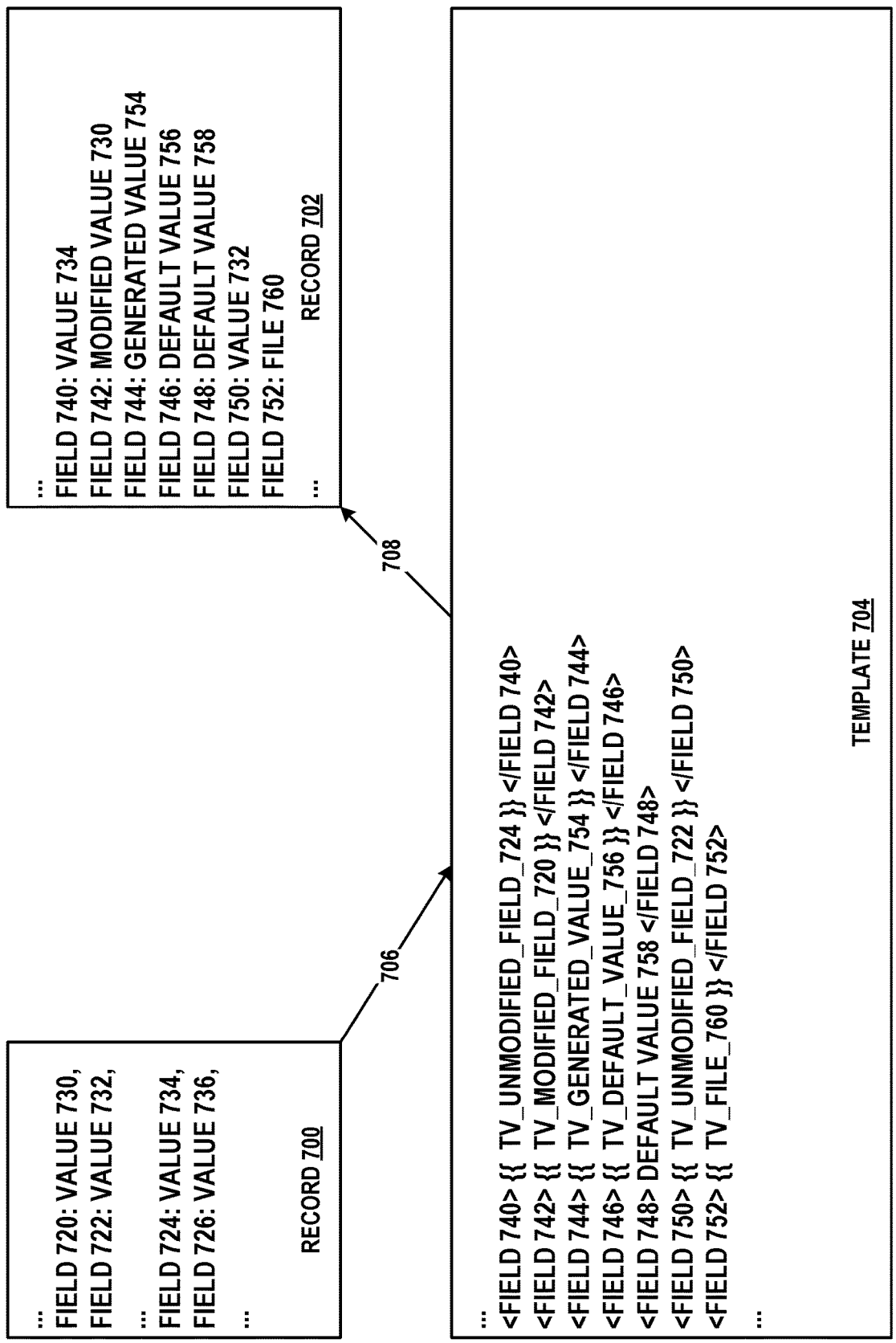
FIG. 7 illustrates records and a template, in accordance with example embodiments.

FIG. 7 illustrates an example record 700, template 704, and record 702. Record 700 may be one example record taken from records 606, and record 702 may be one example record taken from records 644. Record 702 may include fields 720, 722 through 724, and 726 (i.e., fields 720-726) assigned values 730, 732 through 734, and 736 (i.e., values 730-736), respectively. Template 704 includes markup language that defines training schema 642, and template variables indicating how to populate template 704 based on record 700 and/or other data sources, as indicated by arrow 706. Record 702 represents an output of populating template 704 based on record 700, as indicated by arrow 708.

Template 704 includes fields 740, 742, 744, 746, 748, 750, and 752 (i.e., fields 740-752), each of which is indicated using a corresponding line of code written using XML. Template 704 includes template variables placed within double curly braces, which indicates to record transformer 634 that the content of these double curly braces is a template variable to be populated based on a corresponding data source. Template 704 may be based on a format associated with a template engine, such as the Jinja and/or Jinja2 template engines. Record 702 may also include fields 740-752 that, as a result of record transformer populating template 704, are assigned value 734, modified value 730, generated value 754, default value 756, default value 758, value 732, and file 760, respectively.

Specifically, template 704 indicates that field 740 is to be populated based on template variable "TV_UNMODIFIED_FIELD_724," field 742 is to be populated based on template variable "TV_MODIFIED_FIELD_72," field 744 is to be populated based on template variable "TV_GENERATED_VALUE_754," field 746 is to be populated based on template variable "TV_DEFAULT_VALUE_756," field 748 is to be populated using default value 758, field 750 is to be populated based on template variable "TV_UNMODIFIED_FIELD_722," and field 752 is to be populated based on template variable "TV_FILE_760."

TV_UNMODIFIED_FIELD_724 indicates field 724 as the source of the value for field 740. TV_MODIFIED_FIELD_720 which indicates field 720, modified according to value modifier 622, as the source of the value for field 742. TV_GENERATED_VALUE_754 indicates a new value generated by value generator 618 as the source of the value for field 744. TV_DEFAULT_VALUE_756 indicates a default value provided by value generator 618 as the source of the value for field 746. Default value 758 is specified directly by template 704 as the source of the value for field 748. TV_UNMODIFIED_FIELD_722 indicates field 722 as the source of the value for field 750. TV_FILE_760 indicates file 760, which may include value 736 of field 726, as the source of the value for field 752.

Values 734 and 732 represent examples of unmodified value(s) 626. Modified value 730 represents an example of modified value(s) 624. Generated value 754 and default value 756 represent examples of generated value(s) 628. File 760 represents an example of file 632. Thus, record 702 includes at least value 734, modified value 730, generated value 754, value 732, and file 760 (representing value 736) that are based on record 700, but are modified and/or rearranged from a schema associated with record 700 to training schema 642 associated with record 702.

VIII. Example Technical Improvements

These embodiments provide a technical solution to a technical problem. One technical problem being solved is how to generate a sufficient number of training samples for an ML model based on different data sets. In practice, this is problematic because each of the data sets might be organized according to a different schema, and/or might be missing some values, and thus might not be directly usable as training data for the ML model.

In the prior art, a user might attempt to rearrange the different data sets into a training schema associated with the ML model. However, these techniques do not allow training data to be quickly and accurately generated using large data sets, since the user might need to parse and rearrange each record of these data sets. The problem is compounded as the number of training samples and/or data sets increases. Moreover, the prior art relies on subjective decisions and experiences of the users tasked with modifying and/or rearranging the different data sets, which leads to wildly varying outcomes from instance to instance. Thus, prior art techniques did little if anything to address the problems of scalability and data accuracy in training data generation.

The embodiments herein overcome these limitations by providing a software application configured to transform a plurality of data sets into a common training schema utilized by the ML model. In this manner, generation of training data based on different data sets can be accomplished in a more accurate and robust fashion. This results in several advantages. First, multiple data sets can be automatically rearranged into the common training schema without dependence on users performing such rearrangements. Second, records of the multiple data sets can be modified in addition to being rearranged, such as by translating the records into different languages. Third, the records with missing and/or invalid values can be augmented with newly generated values and/or default values that are consistent with the data set.

Other technical improvements may also flow from these embodiments, and other technical problems may be solved. Thus, this statement of technical improvements is not limiting and instead constitutes examples of advantages that can be realized from the embodiments.

IX. Example Operations

Figure 8:
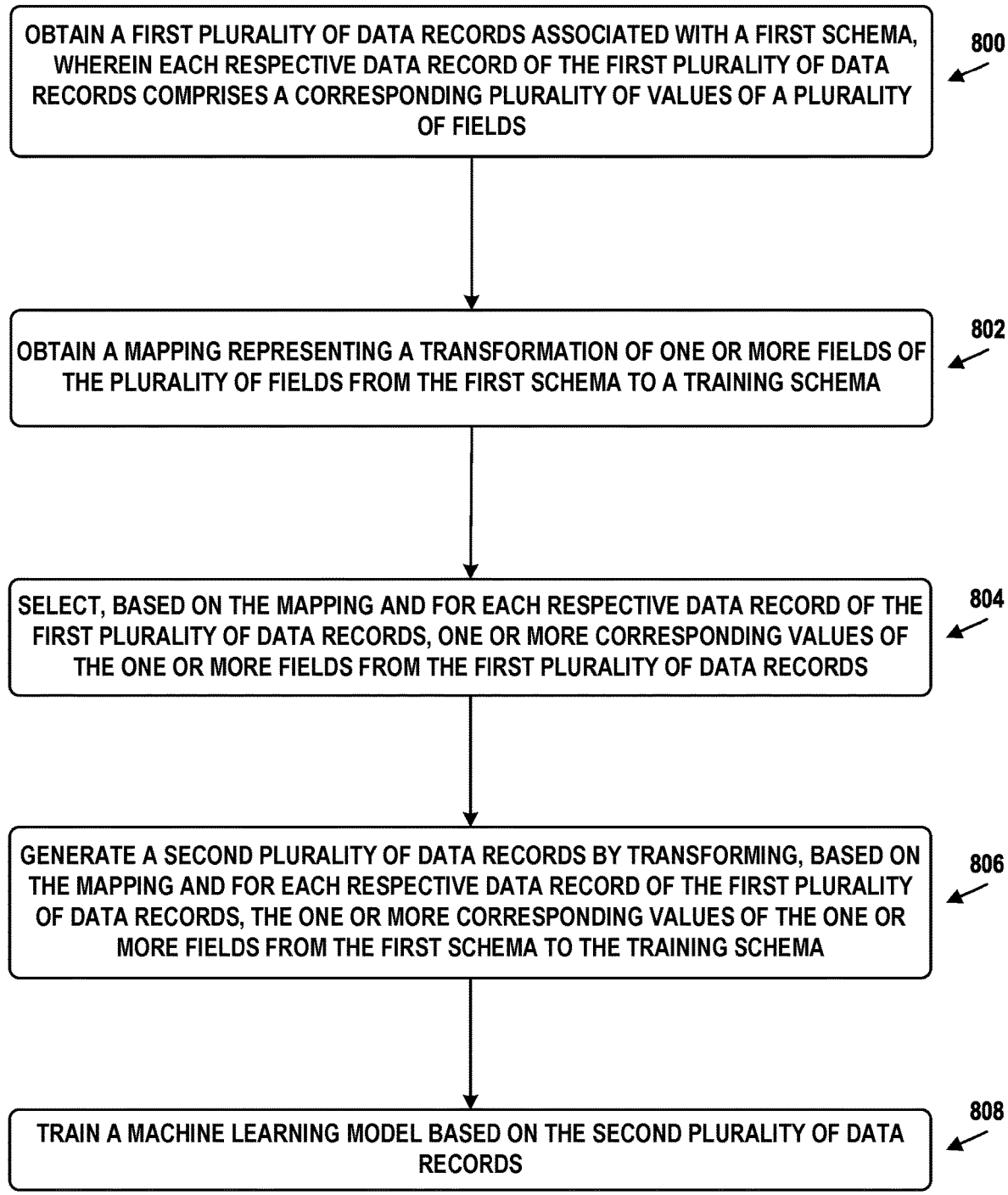
FIG. 8 is a flow chart, in accordance with example embodiments.

FIG. 8 is a flow chart illustrating an example embodiment. The process illustrated by FIG. 8 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 8 may be simplified by the removal of any one or more of the features shown therein. Further, these embodiments may be combined with features, aspects, and/or implementations of any of the previous figures or otherwise described herein.

Block 800 may involve obtaining a first plurality of data records associated with a first schema. Each respective data record of the first plurality of data records may include a corresponding plurality of values of a plurality of fields.

Block 802 may involve obtaining a mapping representing a transformation of one or more fields of the plurality of fields from the first schema to a training schema.

Block 804 may involve selecting, based on the mapping and for each respective data record of the first plurality of data records, one or more corresponding values of the one or more fields from the first plurality of data records.

Block 806 may involve generating a second plurality of data records by transforming, based on the mapping and for each respective data record of the first plurality of data records, the one or more corresponding values of the one or more fields from the first schema to the training schema.

Block 808 may involve training a machine learning model based on the second plurality of data records.

In some examples, respective data records from a plurality of different datasets may be transformed from corresponding schemas thereof to the training schema to generate, based on the plurality of different datasets, training data organized according to the training schema. The training data may include the second plurality of data records.

In some examples, the training schema may be based on a predefined structure for the training data. Training the machine learning model may include training the machine learning model based on the training data.

In some examples, a file of a first file type indicated by the mapping and associated with the training schema may be generated. The file may represent at least one corresponding value of the one or more corresponding values using a format of the first file type. The second plurality of data records may be generated based on the file and may represent the at least one corresponding value using the first file type.

In some examples, the machine learning model may be configured to perform a corresponding task based on files of the first file type.

In some examples, the mapping may include a template that indicates the one or more fields and an arrangement thereof according to the training schema. Generating the second plurality of data records may include populating, for each respective data record of the first plurality of data records, the template based on the one or more corresponding values of the one or more fields, and generating the second plurality of data records based on the template as populated.

In some examples, the template may include (i) predefined markup language that defines the training schema and (ii) template variables embedded in the predefined markup language and configured to represent placement of the one or more fields within the training schema. Populating the template may include replacing the template variables with the one or more corresponding values. Generating the second plurality of data records based on the template as populated may include generating output markup language that includes (i) the predefined markup language and (ii) the template variables replaced with the one or more corresponding values.

In some examples, generating the second plurality of data records may include translating, for each respective data record of the first plurality of data records, at least one corresponding value of the one or more corresponding values from a source language to one or more target languages indicated by the mapping.

In some examples, the training schema may include a missing field that is missing from the first schema. Generating the second plurality of data records may include assigning, for each respective data record of the first plurality of data records, a default value to the missing field.

In some examples, the first schema may represent a structure of a first database table configured to store the first plurality of data records. The training schema may represent a structure of a second database table configured to store the second plurality of data records.

In some examples, the first schema may represent relationships among a first plurality of database tables configured to store the first plurality of data records. The training schema may represent relationships among a second plurality of database tables configured to store the second plurality of data records.

In some examples, generating the second plurality of data records may include generating, for each respective data record of the first plurality of data records, two or more corresponding output records by transforming the one or more corresponding values from the first schema to the training schema according to two or more corresponding transformations indicated by the mapping.

In some examples, the first plurality of data records may represent technical problems and corresponding resolutions thereof organized as one or more database tables that have been populated by technicians based on user inquiries. The second plurality of data records may represent the user inquiries as emails and corresponding one or more database tables to be generated by the machine learning model based on the emails.

X. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:
  obtaining a first plurality of data records associated with a first schema, wherein each respective data record of the first plurality of data records comprises a corresponding plurality of values of a plurality of fields, and wherein the corresponding plurality of values comprises, for each respective field of the plurality of fields, (i) a stored value representing corresponding data for the respective field or (ii) a missing value indicator signifying that the respective field is missing the corresponding data;

obtaining a mapping representing a transformation of one or more fields of the plurality of fields from the first schema to a training schema;

selecting, based on the mapping and for each respective data record of the first plurality of data records, one or more corresponding values of the one or more fields from the first plurality of data records;

determining that a first data record of the first plurality of data records comprises the missing value indicator signifying that a first field of the one or more fields of the first data record is missing the corresponding data;

generating a second plurality of data records by:
(i) transforming, based on the mapping and for each respective data record of at least a subset of the first plurality of data records, the one or more corresponding values of the one or more fields from the first schema to the training schema and
(ii) based on determining that the first data record comprises the missing value indicator, generating a new value representing new data with which to populate the first field, wherein the new value is generated using a generative machine learning model based on the stored value of the first field of a second data record of the first plurality of data records; and training a machine learning model based on the second plurality of data records.

2. The method of claim 1, wherein respective data records from a plurality of different datasets are transformed from corresponding schemas thereof to the training schema to generate, based on the plurality of different datasets, training data organized according to the training schema, wherein the training data comprises the second plurality of data records.

3. The method of claim 2, wherein the training schema is based on a predefined structure for the training data, and wherein training the machine learning model comprises:
training the machine learning model based on the training data.

4. The method of claim 1, further comprising:
generating a file of a first file type indicated by the mapping and associated with the training schema, wherein the file represents at least one corresponding value of the one or more corresponding values using a format of the first file type, and wherein the second plurality of data records is generated based on the file and represents the at least one corresponding value using the first file type.

5. The method of claim 4, wherein the machine learning model is configured to perform a corresponding task based on files of the first file type.

6. The method of claim 1, wherein the mapping comprises a template that indicates the one or more fields and an arrangement thereof according to the training schema, and wherein generating the second plurality of data records comprises:
populating, for each respective data record of the first plurality of data records, the template based on one or more of: (i) the one or more corresponding values of the one or more fields or (ii) the new value; and
generating the second plurality of data records based on the template as populated.

7. The method of claim 6, wherein:
the template comprises (i) predefined markup language that defines the training schema and (ii) template variables embedded in the predefined markup language and configured to represent placement of the one or more fields within the training schema;
populating the template comprises replacing the template variables with one or more of: the one or more corresponding values or the new value; and
generating the second plurality of data records based on the template as populated comprises generating output markup language comprising (i) the predefined markup language and (ii) the template variables replaced with the one or more of: the one or more corresponding values or the new value.

8. The method of claim 1, wherein generating the second plurality of data records comprises:
translating, for each respective data record of at least the subset of the first plurality of data records, at least one corresponding value of the one or more corresponding values from a source language to one or more target languages indicated by the mapping.

9. The method of claim 1, wherein the training schema includes a missing field that is missing from the first schema, and wherein generating the second plurality of data records comprises:
assigning, for each respective data record of the first plurality of data records, a default value to the missing field.

10. The method of claim 1, wherein the first schema represents a structure of a first database table configured to store the first plurality of data records, and wherein the training schema represents a structure of a second database table configured to store the second plurality of data records.

11. The method of claim 1, wherein the first schema represents relationships among a first plurality of database tables configured to store the first plurality of data records, and wherein the training schema represents relationships among a second plurality of database tables configured to store the second plurality of data records.

12. The method of claim 1, wherein generating the second plurality of data records comprises:
generating, for each respective data record of at least the subset of the first plurality of data records, two or more corresponding output records by transforming the one or more corresponding values from the first schema to the training schema according to two or more corresponding transformations indicated by the mapping.

13. The method of claim 1, wherein the first plurality of data records represents technical problems and corresponding resolutions thereof organized as one or more database tables that have been populated by technicians based on user inquiries, and wherein the second plurality of data records represents the user inquiries as emails and corresponding one or more database tables to be generated by the machine learning model based on the emails.

14. The method of claim 1, wherein generating the new value comprises:
using the generative machine learning model to process the stored value of the first field of each respective record of the subset of the first plurality of data records, wherein the subset of the first plurality of data records comprises a second plurality of data records, and wherein the generative machine learning model is configured to generate the new value based on a distribution of the stored values of the first field in the second plurality of data records.

15. A non-transitory computer-readable medium, having stored thereon program instructions that, upon execution by a computing system, cause the computing system to perform operations comprising:
obtaining a first plurality of data records associated with a first schema, wherein each respective data record of the first plurality of data records comprises a corresponding plurality of values of a plurality of fields, and wherein the corresponding plurality of values comprises, for each respective field of the plurality of fields, (i) a stored value representing corresponding data for the respective field or (ii) a missing value indicator signifying that the respective field is missing the corresponding data;

obtaining a mapping representing a transformation of one or more fields of the plurality of fields from the first schema to a training schema;

selecting, based on the mapping and for each respective data record of the first plurality of data records, one or more corresponding values of the one or more fields from the first plurality of data records;

determining that a first data record of the first plurality of data records comprises the missing value indicator signifying that a first field of the one or more fields of the first data record is missing the corresponding data;

generating a second plurality of data records by:
(i) transforming, based on the mapping and for each respective data record of at least a subset of the first plurality of data records, the one or more corresponding values of the one or more fields from the first schema to the training schema and
(ii) based on determining that the first data record comprises the missing value indicator, generating a new value representing new data with which to populate the first field, wherein the new value is generated using a generative machine learning model based on the stored value of the first field of a second data record of the first plurality of data records; and training a machine learning model based on the second plurality of data records.

16. The non-transitory computer-readable medium of claim 15, wherein respective data records from a plurality of different datasets are transformed from corresponding schemas thereof to the training schema to generate, based on the plurality of different datasets, training data organized according to the training schema, wherein the training data comprises the second plurality of data records.

17. The non-transitory computer-readable medium of claim 15, wherein the operations further comprise:
generating a file of a first file type indicated by the mapping and associated with the training schema, wherein the file represents at least one corresponding value of the one or more corresponding values using a format of the first file type, and wherein the second plurality of data records is generated based on the file and represents the at least one corresponding value using the first file type.

18. The non-transitory computer-readable medium of claim 15, wherein the mapping comprises a template that indicates the one or more fields and an arrangement thereof according to the training schema, and wherein generating the second plurality of data records comprises:
populating, for each respective data record of the first plurality of data records, the template based on one or more of: (i) the one or more corresponding values of the one or more fields or (ii) the new value; and
generating the second plurality of data records based on the template as populated.

19. The non-transitory computer-readable medium of claim 18, wherein:
the template comprises (i) predefined markup language that defines the training schema and (ii) template variables embedded in the predefined markup language and configured to represent placement of the one or more fields within the training schema;
populating the template comprises replacing the template variables with one or more of: the one or more corresponding values or the new value; and
generating the second plurality of data records based on the template as populated comprises generating output markup language comprising (i) the predefined markup language and (ii) the template variables replaced with the one or more of: the one or more corresponding values or the new value.

20. A system comprising:
one or more processors; and
memory, containing program instructions that, upon execution by the one or more processors, cause the system to perform operations comprising:
obtaining a first plurality of data records associated with a first schema, wherein each respective data record of the first plurality of data records comprises a corresponding plurality of values of a plurality of fields, and wherein the corresponding plurality of values comprises, for each respective field of the plurality of fields, (i) a stored value representing corresponding data for the respective field or (ii) a missing value indicator signifying that the respective field is missing the corresponding data;
obtaining a mapping representing a transformation of one or more fields of the plurality of fields from the first schema to a training schema;
selecting, based on the mapping and for each respective data record of the first plurality of data records, one or more corresponding values of the one or more fields from the first plurality of data records;
determining that a first data record of the first plurality of data records comprises the missing value indicator signifying that a first field of the one or more fields of the first data record is missing the corresponding data;
generating a second plurality of data records by:
(i) transforming, based on the mapping and for each respective data record of at least a subset of the first plurality of data records, the one or more corresponding values of the one or more fields from the first schema to the training schema and
(ii) based on determining that the first data record comprises the missing value indicator, generating a new value representing new data with which to populate the first field, wherein the new value is generated using a generative machine learning model based on the stored value of the first field of a second data record of the first plurality of data records; and
training a machine learning model based on the second plurality of data records.

* * * * *